US009081525B2

(12) United States Patent
Ohkawa

(10) Patent No.: US 9,081,525 B2
(45) Date of Patent: Jul. 14, 2015

(54) IMAGE PROCESSING APPARATUS, INFORMATION PROCESSING METHOD, AND STORAGE MEDIUM FOR REDUCING IMAGE FORMATION TIME AFTER A FIREWARE UPDATE

(71) Applicant: Canon Kabushiki Kaisha, Tokyo (JP)

(72) Inventor: Shuichi Ohkawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/271,794

(22) Filed: May 7, 2014

(65) Prior Publication Data
US 2014/0333967 A1 Nov. 13, 2014

(30) Foreign Application Priority Data

May 8, 2013 (JP) ................................. 2013-098666

(51) Int. Cl.
*G06K 15/00* (2006.01)
*G06F 3/12* (2006.01)
*G06K 15/02* (2006.01)
*H04N 1/00* (2006.01)

(52) U.S. Cl.
CPC .............. *G06F 3/123* (2013.01); *G06F 3/1225* (2013.01); *G06K 15/1805* (2013.01); *G06K 15/1886* (2013.01); *H04N 1/00278* (2013.01); *H04N 2201/0087* (2013.01); *H04N 2201/0094* (2013.01)

(58) Field of Classification Search
None
See application file for complete search history.

(56) References Cited

U.S. PATENT DOCUMENTS

| 2009/0235242 | A1* | 9/2009 | Kawaguchi | 717/168 |
| 2011/0085206 | A1* | 4/2011 | Muto | 358/1.15 |
| 2011/0242579 | A1* | 10/2011 | Pinney | 358/1.15 |
| 2013/0268790 | A1* | 10/2013 | Nakai | 713/323 |

FOREIGN PATENT DOCUMENTS

| JP | 4072525 B | 4/2008 |
| JP | 4324526 B | 9/2009 |

* cited by examiner

*Primary Examiner* — Marcus T Riley
(74) *Attorney, Agent, or Firm* — Canon USA, Inc., IP Division

(57) ABSTRACT

An image processing apparatus includes an image processing unit configured to perform image processing on input data, a storage unit configured to store image-processed data obtained by the image processing performed by the image processing unit, an output unit configured to output the image-processed data to a printing unit, an update unit configured to update firmware related to the image processing unit, and a control unit configured to, when the image processing by the image processing unit is changed by the updating of the firmware by the update unit, cause the image processing unit to perform the image processing on input data corresponding to the image-processed data stored in the storage unit and cause the storage unit to store image-processed data obtained by the image processing.

9 Claims, 19 Drawing Sheets

FIG.7

| IMAGE CORRECTION VER. | RIP ver. | LAST UPDATED VER. OF RED-EYE CORRECTION | LAST UPDATED VER. OF SKIN TEXTURE AND COLOR CORRECTION | LAST UPDATED VER. OF RGB RIP | LAST UPDATED VER. OF CMYK RIP |
|---|---|---|---|---|---|
| 03.07.05 | 07.03.40 | 03.06.13 | 03.07.01 | 07.03.40 | 06.03.18 |

FIG.12

| INDEX | INPUT ID | OUTPUT ID | IMAGE CORRECTION VER. | RIP ver. | RED-EYE CORRECTION | SKIN TEXTURE AND COLOR CORRECTION | RGB RIP | CMYK RIP | LAST RIP PROCESSING DATE | LAST PRINT DATE |
|---|---|---|---|---|---|---|---|---|---|---|
| 0 | 11 | 28 | 03.05.00 | 07.01.13 | 1 | 1 | 1 | 0 | 2012/05/01 | 2012/05/01 |
| 1 | 11 | 29 | 03.06.13 | 07.01.13 | 0 | 1 | 0 | 1 | 2012/06/29 | 2012/06/29 |
| 2 | 20 | 31 | 03.06.13 | 07.02.00 | 0 | 0 | 0 | 0 | 2012/06/24 | 2012/06/24 |
| 3 | 56 | 32 | 03.07.02 | 07.03.40 | 1 | 0 | 1 | 0 | 2012/06/25 | 2012/06/26 |
| 4 | 562 | 398 | 03.07.02 | 07.03.40 | 1 | 1 | 0 | 1 | 0 | 0 |
| 5 | 786 | 926 | 03.05.00 | 07.03.40 | 1 | 1 | 1 | 0 | 2012/08/30 | 0 |

FIG.15

| | SETTING VALUE | UNIT |
|---|---|---|
| PROCESSING TIME OF JOB TO BE STORED | 30 [+/-] | MINUTE(S) OR MORE ▽ |
| JOB TYPE OF JOB TO BE STORED | PDF ▽ | — |
| | ALL | |
| | NON-PDL | |
| | PDL | |
| | PDF | |
| | XPS | |

FIG.16

| | SETTING VALUE | UNIT |
|---|---|---|
| PROCESSING TIME OF JOB TO BE STORED | 30 [+] [−] | MINUTE(S) OR MORE ▽ |
| JOB TYPE OF JOB TO BE STORED | PDF ▽ | MINUTE(S) OR MORE |
| | | HOUR(S) OR MORE |
| | | LESS THAN ... MINUTE(S) |
| | | LESS THAN ... HOUR(S) |

FIG.17

| JobID | 0001 | 0002 | 0003 | 0004 |
|---|---|---|---|---|
| TOP IMAGE | ■ | ■ | xxx | |
| TOTAL PAGE | 4 | 20 | 11 | 7 |
| RIP PROCESSING DATE | 2012 6/11 | 2012 6/12 | 2012 6/13 | — |
| FW VER. | 01.01.13 | 01.01.13 ▽ | 01.01.13 ▽ | 01.01.13 |

FIG.18

| LATEST VERSION | | | | | | |
|---|---|---|---|---|---|---|
| ◀ | | | JUNE 2012 | | | ▶ |
| SUN | MON | TUE | WED | THU | FRI | SAT |
| 27 | 28 | 29 | 30 | 31 | 1 | 2 |
| 3 | 4 | 5 | 6 | 7 | 8 | 9 |
| 10 | 11 | 12 | 13 | 14 | 5 | 16 |
| 17 | 18 | 19 | 20 | 21 | 22 | 23 |
| 24 | 25 | 26 | 27 | 28 | 29 | 30 |
| 1 | 2 | 3 | 4 | 5 | 6 | 7 |

NOT SPECIFIED

FIG.19

| JobID | STATUS | RIP TIME | PAGE | RIP PROCESSING DATE | FW VER. | CONTENTS |
|---|---|---|---|---|---|---|
| 0001 | PRINTED | 00:05:12 | 4 | 2012/06/11 | 01.01.13 | △ |
| 0002 | PRINTING UNDERWAY | 00:22:22 | 20 | 2012/06/12 ▷ | 01.01.13 ▷ | △ |
| 0003 | PRINTING STANDBY | 00:15:09 | 11 | 2012/06/13 ▷ | 01.01.13 ▷ | △ |
| 0004 | RIP PROCESSING UNDERWAY | hh:mm:ss | 7 | LATEST VERSION | 01.01.13 | |

JUNE 2012

| SUN | MON | TUE | WED | THU | FRI | SAT |
|---|---|---|---|---|---|---|
| 27 | 28 | 29 | 30 | 31 | 1 | 2 |
| 3 | 4 | 5 | 6 | 7 | 8 | 9 |
| 10 | 11 | 12 | 13 | 14 | 15 | 16 |
| 17 | 18 | 19 | 20 | 21 | 22 | 23 |
| 24 | 25 | 26 | 27 | 28 | 29 | 30 |
| 1 | 2 | 3 | 4 | 5 | 6 | 7 |

NOT SPECIFIED

IMAGE PROCESSING APPARATUS, INFORMATION PROCESSING METHOD, AND STORAGE MEDIUM FOR REDUCING IMAGE FORMATION TIME AFTER A FIREWARE UPDATE

BACKGROUND OF THE INVENTION

1. Field of the Invention

The present invention relates to an image processing apparatus, an information processing method, and a storage medium.

2. Description of the Related Art

Japanese Patents Nos. 4324526 and 4072525 discuss techniques for allowing a user to, if there is a hold job to be executed using a function inconsistent before and after firmware update, select whether to delete, force printing of, or suspend the corresponding job data.

The foregoing techniques have a problem that, in a case where an image is formed again after the firmware update, the image needs to be re-processed.

SUMMARY OF THE INVENTION

The present invention is directed to a technique for reducing time required to form an image again after firmware update.

According to an aspect of the present invention, an image processing apparatus includes an image processing unit configured to perform image processing on input data, a storage unit configured to store image-processed data obtained by the image processing performed by the image processing unit, an output unit configured to output the image-processed data to a printing unit, an update unit configured to update firmware related to the image processing unit, and a control unit configured to, when the image processing by the image processing unit is changed by the updating of the firmware by the update unit, cause the image processing unit to perform the image processing on input data corresponding to the image-processed data stored in the storage unit and cause the storage unit to store image-processed data obtained by the image processing.

Further features of the present invention will become apparent from the following description of exemplary embodiments with reference to the attached drawings.

BRIEF DESCRIPTION OF THE DRAWINGS

FIG. 7 is a diagram illustrating an example of firmware information.

FIG. 12 is a diagram illustrating an example of a firmware information management table.

FIG. 15 is a diagram illustrating an example of a screen for setting a condition for whether to store RIP-processed data in preparation for reprinting.

FIG. 16 is a diagram illustrating an example of the screen for setting a condition for whether to store RIP-processed data in preparation for reprinting.

FIG. 17 is a diagram illustrating an example of information presented to a user when performing reprinting.

FIG. 18 is a diagram illustrating an example of a screen for specifying a RIP processing date.

FIG. 19 is a diagram illustrating an example of a screen for issuing a reprinting instruction.

DESCRIPTION OF THE EMBODIMENTS

Various exemplary embodiments, features, and aspects of the invention will be described in detail below with reference to the drawings.

Figure 1:
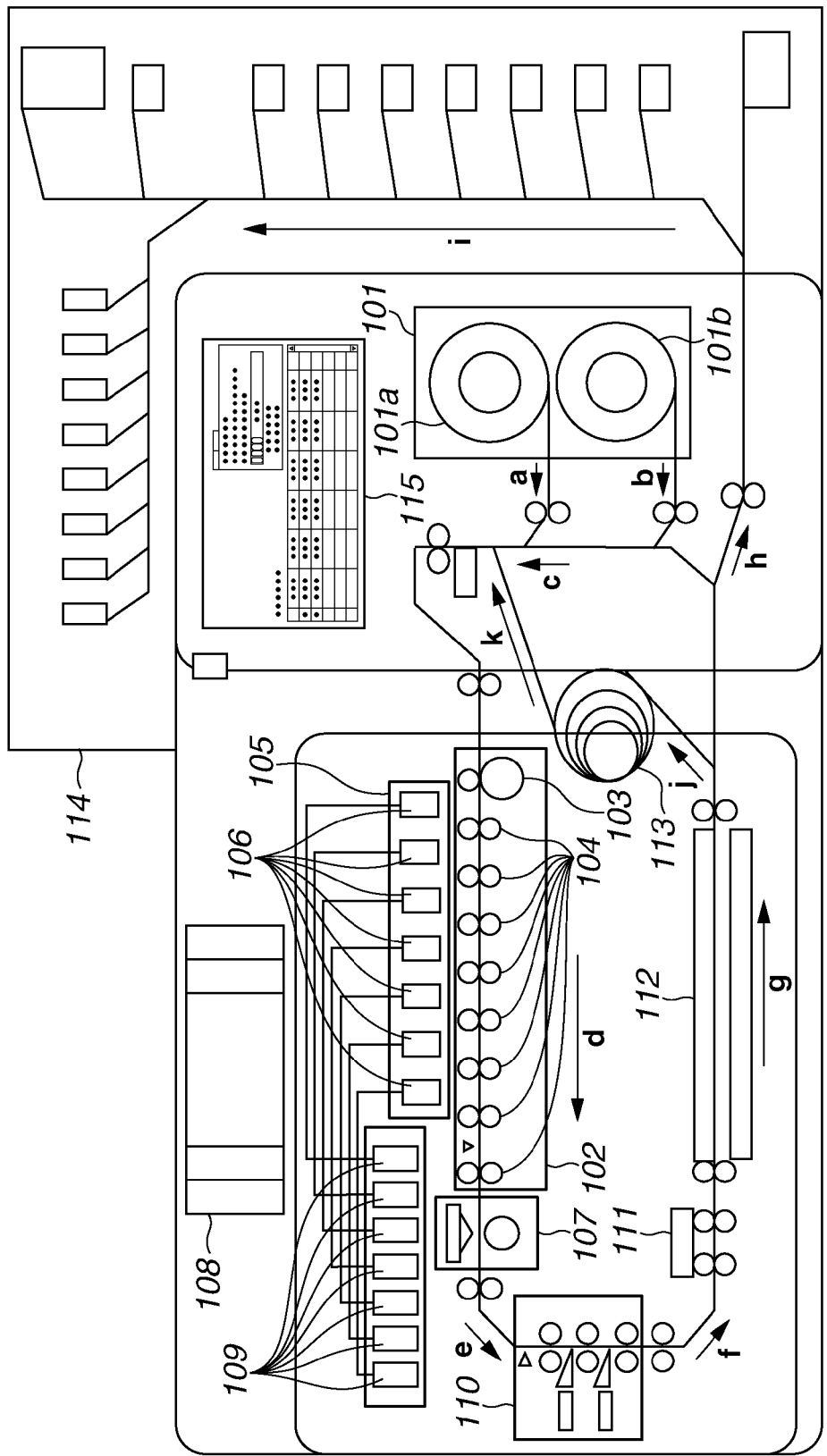
FIG. 1 is a sectional view illustrating an entire configuration of an image forming apparatus using a roll sheet.

FIG. 1 is a sectional view illustrating an entire configuration of an image forming apparatus using a roll sheet (continuous sheet that is continuous and has a length greater than a unit length of printing in a conveyance direction). The image forming apparatus is an example of an image processing apparatus.

The image forming apparatus includes a roll sheet unit 101, a conveyance unit 102, a conveyance encoder 103, rotation rollers 104, a head unit 105, print heads 106, a scanner unit 107, a control unit 108, ink tanks 109, and a cutter unit 110. The image forming apparatus further includes a back side print unit 111, a drying unit 112, a sheet winding unit 113, a sorting unit 114, and an operation unit 115. Such units are arranged in an apparatus housing.

The control unit 108 includes a built-in control portion including a controller, a user interface, and various types of input/output (I/O) interfaces. The control unit 108 performs various control operations on the entire image forming apparatus.

The roll sheet unit 101 includes two sheet cassettes, an upper sheet cassette 101a and a lower sheet cassette 101b. A user attaches roll sheets (hereinafter, referred to as sheets) to magazines, and inserts and loads the magazines into a main body of the image forming apparatus from the front. The sheet pulled out of the upper sheet cassette 101a is conveyed in an "a" direction in FIG. 1. The sheet pulled out of the lower sheet cassette 101b is conveyed in a "b" direction in FIG. 1. The sheet from either of the upper and lower sheet cassettes 101a and 101b advances in a "c" direction in FIG. 1 to reach the conveyance unit 102.

The conveyance unit 102 conveys the sheet between the plurality of rotation rollers 104 in a "d" direction (horizontal direction) in FIG. 1 during printing.

The head unit 105 is arranged above and opposed to the conveyance unit 102. The head unit 105 holds independent print heads 106 each of which corresponds to a different one of a plurality of colors (in the exemplary embodiment, seven colors) along the conveyance direction of the sheet. The print heads 106 discharge ink in synchronization with the conveyance of the sheet by the conveyance unit 102, whereby an image is formed on the sheet. The conveyance unit 102, the head unit 105, and the print heads 106 constitute a printing unit.

Each of the ink tanks 109 independently stores a different one of inks of the plurality of colors. The respective inks are supplied via tubes from the ink tanks 109 to sub tanks each of which is provided corresponding to a different one of the plurality of colors. The inks are then supplied from the sub tanks to the respective print heads 106 via tubes. The print heads 106 are line heads of the respective colors (in the exemplary embodiment, seven colors) which are arranged in the "d" direction, i.e., the conveyance direction for printing. The line head of each color may be formed by a seamless single nozzle chip or divided nozzle chips arranged in a row or in a regular arrangement such as a staggered arrangement. The present exemplary embodiment is assumed to use a full multi-head in which nozzles are arranged to cover the printing width of a maximum sheet to be used. Inkjet methods available for discharging ink from the nozzles include a method using heating elements, a method using piezoelectric elements, a method using electrostatic elements, and a method using micro-electro-mechanical systems (MEMS) elements. The respective nozzles of the print heads 106 discharge ink based on print data. The discharge timing is determined based on an output signal of the conveyance encoder 103. The present exemplary embodiment is not limited to an inkjet printer, and printers of various printing methods are applicable. Examples include thermal printers (sublimation printer and thermal transfer printer), dot impact printers, light-emitting diode (LED) printers, and laser printers.

The sheet on which the image has been formed is conveyed from the conveyance unit 102 to the scanner unit 107. The scanner unit 107 reads a print image and/or a special pattern to check the print image for a problem and/or check a state of the image forming apparatus. In the present exemplary embodiment, as a method for checking an image, a method for reading a pattern for checking a state of the print heads 106 and a method for comparing the image with an original image may be selected, for example.

The sheet conveyed from the scanner unit 107 is conveyed in an "e" direction and guided into the cutter unit 110. The cutter unit 110 cuts the sheet in a predetermined unit length of printing. The predetermined unit length of printing varies depending on the size of an image to be printed. For example, an L-size picture has a length of 135 mm in the conveyance direction. An A4-size image has a length of 297 mm in the conveyance direction.

The sheet conveyed from the cutter unit 110 is conveyed inside the image forming apparatus in an "f" direction in FIG. 1 to the back side print unit 111. The back side print unit 111 is a unit for printing information about each print image (for example, an order management number).

The sheet is conveyed from the back side print unit 111 to the drying unit 112. The drying unit 112 heats, with hot air, the sheet passing through the drying unit 112 in a "g" direction in FIG. 1 so that the ink-applied sheet is dried in a short time. Sheets cut in unit lengths of printing are passed through the drying unit 112 one by one, and conveyed in an "h" direction in FIG. 1 to the sorting unit 114. The sorting unit 114 checks, with a sensor, the sheets passing through the sorting unit 114 in an "i" direction in FIG. 1, and stacks each of the sheets on a tray with a corresponding number set for each print image. The sorting unit 114 includes a plurality of trays (in the present exemplary embodiment, 22 trays), and determines a tray for stacking sheets thereon according to the unit length of printing. The sorting unit 114 displays states such as stacking underway and stacking completed (for example, displays the states by using LEDs).

For two-sided printing, front-side images are initially formed on the sheet. The sheet is not cut by the cutter unit 110 but passed inside the image forming apparatus in a "j" direction in FIG. 1 and wound by the sheet winding unit 113. The sheet winding unit 113 is a unit for conveying the wound sheet inside the image forming apparatus again in a "k" direction in FIG. 1 to print back-side images after completion of the formation of all the front-side images.

The operation unit 115 is a unit for an operator to perform operations and/or checks. Using the operation unit 115, the operator may check printing statuses order by order and check the state of the image forming apparatus. For example, the operator may check which tray a sheet with an image of a specified order is stacked on, or whether an image of a specified order is being printed or has been printed. The operator may also check remaining ink levels and the remaining amount of paper.

The control portion of the control unit 108 performs processing based on a program stored in a memory of the control unit 108, whereby a software configuration included in a control unit 203 of the image forming apparatus (described below) and processing according to flowcharts (described below) are implemented.

A first exemplary embodiment will be described below.

Figure 2:
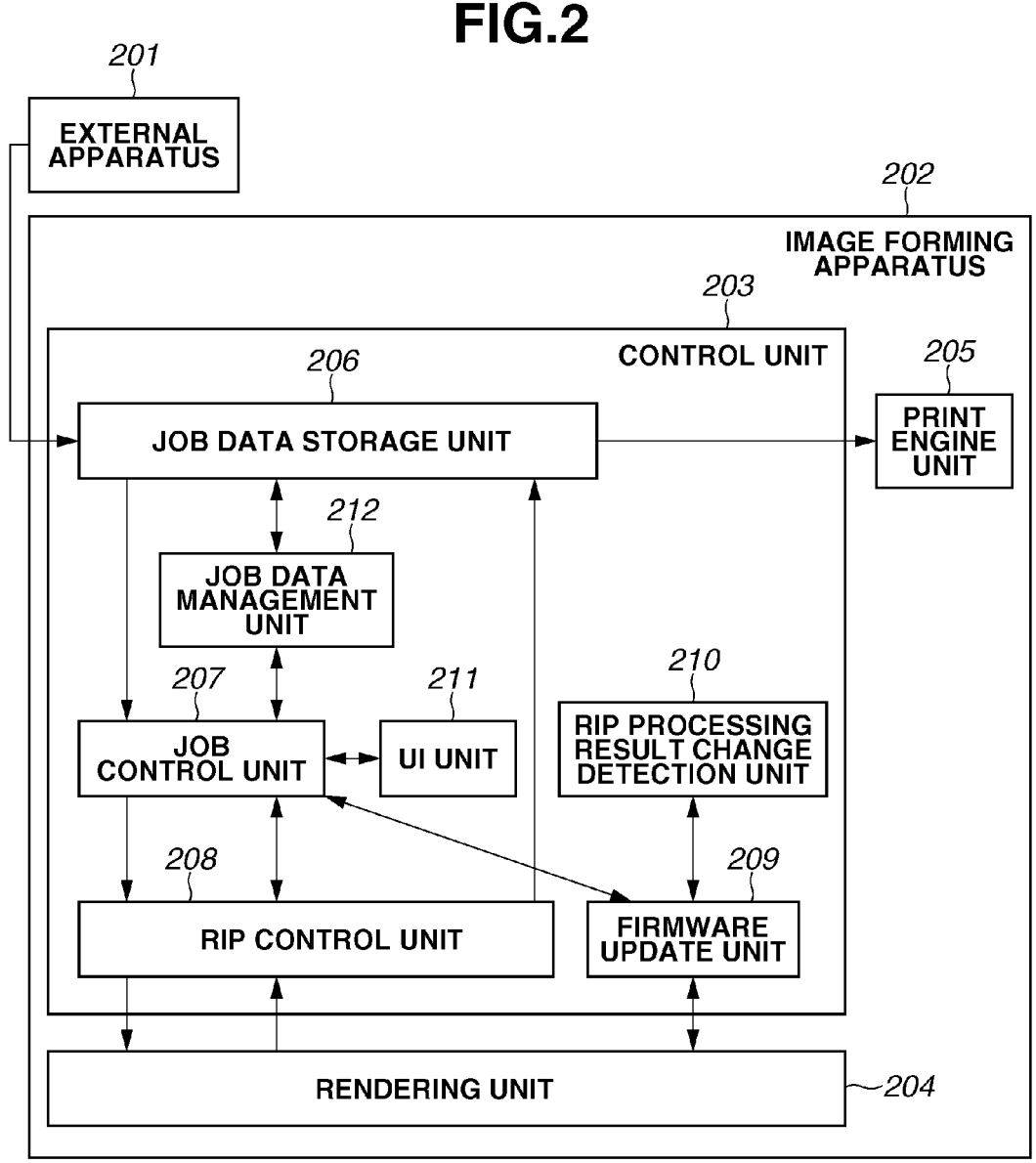
FIG. 2 is a diagram illustrating an example of a software configuration of an image forming apparatus.

FIG. 2 is a diagram illustrating an example of a software configuration of an image forming apparatus.

An image forming apparatus 202 includes a control unit 203, a rendering unit 204, and a print engine unit 205.

The control unit 203 includes a job data storage unit 206, a job control unit 207, a RIP control unit 208, a firmware update unit 209, a RIP processing result change detection unit 210, a user interface (UI) unit 211, and a job data management unit 212. As described above, the control portion of the control unit 108 performs processing based on a program stored in the memory of the control unit 108, whereby each of the units 207 to 212 constituting the control unit 203 is implemented.

To process job data sent from outside the image forming apparatus 202, an external apparatus 201 transfers the job data to the image forming apparatus 202. The job data is stored in the job data storage unit 206 of the control unit 203.

The job data management unit 212 manages information indicating that the job data has been stored in the job data storage unit 206. The job control unit 207 requests the RIP control unit 208 to perform image processing on the job data stored in the job data storage unit 206.

Receiving the request for the image processing, the RIP control unit 208 performs the image processing by using the rendering unit 204. The RIP control unit 208 stores image-processed data in the job data storage unit 206, and notifies the job control unit 207 of the completion of the image processing.

The job data management unit 212 manages information indicating that the image-processed data has been stored in the job data storage unit 206, and manages the correspondence between the job data and the image-processed data stored in the job data storage unit 206.

Thus, the job data storage unit 206 stores the data both before and after the image processing.

When updating firmware, the job control unit 207 requests the firmware update unit 209 to perform firmware update. Receiving the request for the firmware update, the firmware update unit 209 detects by using the RIP processing result change detection unit 210 whether a result of the image processing changes, and updates the firmware of the rendering unit 204.

If the RIP processing result change detection unit 210 detects that the result of the image processing changes, the firmware update unit 209 notifies the job control unit 207 of the completion of the update of the firmware, and requests the job control unit 207 to update the image-processed data stored in the job data storage unit 206.

Receiving the request to update the image-processed data, the job control unit 207 inquires of the job data management unit 212 about whether there is a piece of image-processed data stored in the job data storage unit 206.

Receiving the inquiry, the job data management unit 212 refers to management information, and replies to the job control unit 207 about whether there is a piece of image-processed data stored in the job data storage unit 206.

If there is a piece of image-processed data, the job control unit 207 inquires of the job data management unit 212 which piece of job data stored in the job data storage unit 206 corresponds to the piece of image-processed data.

Receiving the inquiry, the job data management unit 212 refers to the management information to identify the piece of job data stored in the job data storage unit 206 corresponding to the piece of image-processed data, and replies to the job control unit 207.

The job control unit 207 causes the RIP control unit 208 to perform the image processing on the corresponding job data in the job data storage unit 206 in a similar manner to when processing job data sent from outside the image forming apparatus 202. The job control unit 207 causes the job data storage unit 206 to store data obtained by the image processing.

The job control unit 207 performs the operation for updating the image-processed data until there is no image-processed data yet to be updated.

When printing, the job control unit 207 transfers the image-processed data from the job data storage unit 206 to the print engine unit 205. The print engine unit 205 prints the transferred image-processed data, i.e., RIP-processed data.

A second exemplary embodiment will be described below.

Figure 3:
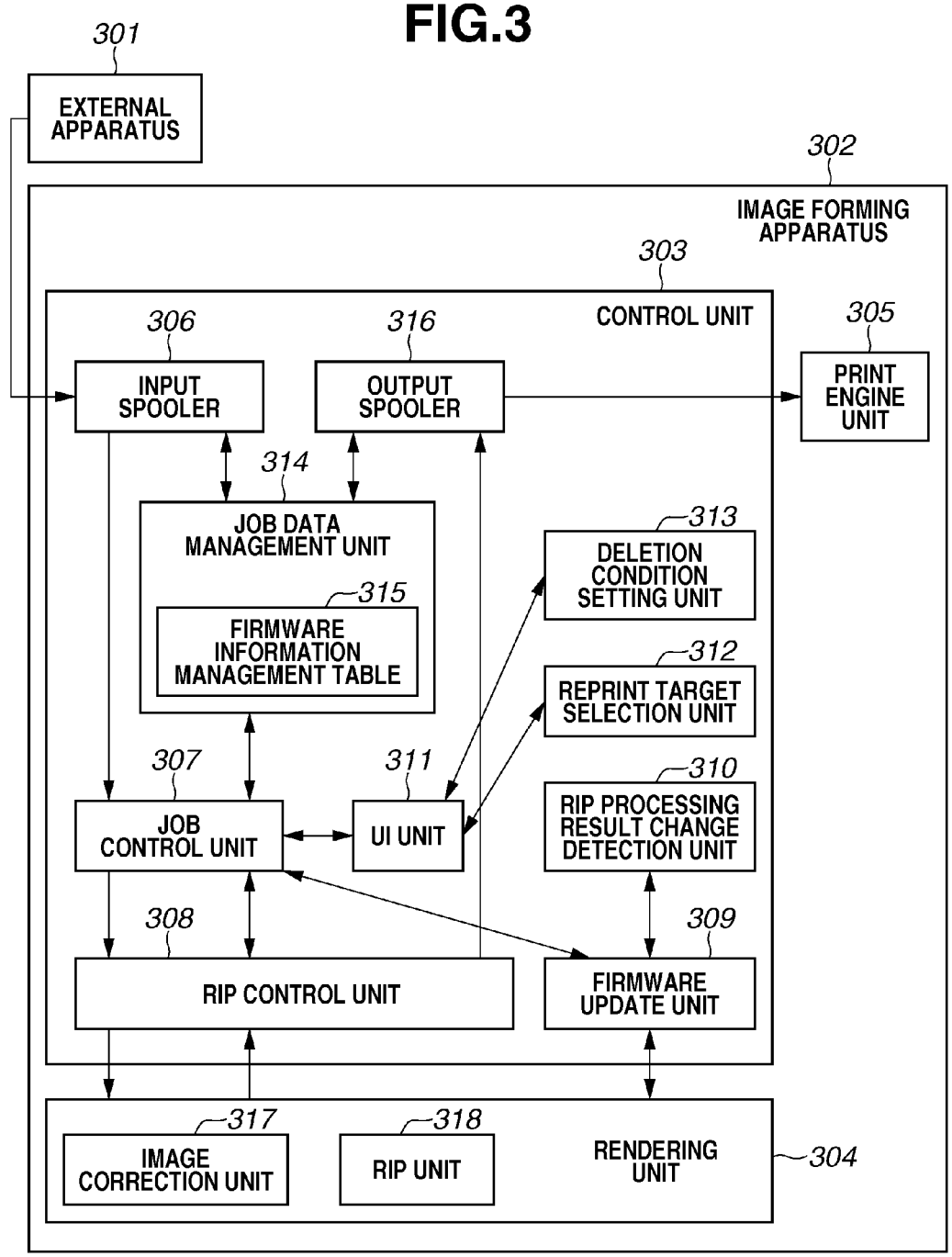
FIG. 3 is a diagram illustrating an example of a software configuration of an image forming apparatus.

FIG. 3 is a diagram illustrating an example of a software configuration of an image forming apparatus.

An image forming apparatus 302 includes a control unit 303, a rendering unit 304, and a print engine unit 305.

The control unit 303 includes an input spooler 306, a job control unit 307, a RIP control unit 308, a firmware update unit 309, a RIP processing result change detection unit 310, an UI unit 311, and a reprint target selection unit 312. The control unit 303 further includes a deletion condition setting unit 313, a job data management unit 314, and an output spooler 316. As described above, the control portion of the control unit 108 performs processing based on a program stored in the memory of the control unit 108, whereby each of the units 307 to 314 constituting the control unit 303 is implemented.

When the user sets a condition for deleting image-processed data stored in the output spooler 316 via the UI unit 311, the UI unit 311 uses the deletion condition setting unit 313. To process job data sent from outside the image forming apparatus 302, an external apparatus 301 transfers the job data to the image forming apparatus 302. The job data is then stored in the input spooler 306 of the control unit 303.

The job data management unit 314 manages information indicating that the job data has been stored in the input spooler 306. The job control unit 307 requests the RIP control unit 308 to perform image processing on the job data stored in the input spooler 306.

Receiving the request for the image processing, the RIP control unit 308 performs the image processing by using an image correction unit 317 and a RIP unit 318 of the rendering unit 304. Further, the RIP control unit 308 deletes image-processed data stored in the output spooler 316 according to the deletion condition set in advance using the deletion condition setting unit 313, and stores image-processed data in the output spooler 316. Then, the RIP control unit 308 notifies the job control unit 307 of the completion of the image processing.

The job data management unit 314 manages, by using a firmware information management table 315, information about firmware version or versions used when the image-processed data stored in the output spooler 316 has been processed. The job data management unit 314 also manages the correspondence between the job data stored in the input spooler 306 and the image-processed data stored in the output spooler 316.

When updating firmware, the job control unit 307 requests the firmware update unit 309 to perform firmware update. Receiving the request for the firmware update, the firmware update unit 309 updates the firmware of the rendering unit 304. The firmware update unit 309 then inquires of the RIP processing result change detection unit 310 about whether a result of the imaging processing changes.

Receiving the inquiry, the RIP processing result change detection unit 310 checks whether the version of the image correction unit 317 has changed. If the version has changed, the RIP processing result change detection unit 310 replies to the firmware update unit 309 that "a RIP processing result changes." If the version has not changed, the RIP processing result change detection unit 310 checks whether the version of the RIP unit 318 has changed. If the version has changed, the RIP processing result change detection unit 310 replies to the firmware update unit 309 that "a RIP processing result changes." If the version has not changed, the RIP processing result change detection unit 310 replies to the firmware update unit 309 that "a RIP processing result does not change."

If the RIP processing result change detection unit 310 detects that the result of the image processing changes, the firmware update unit 309 notifies the job control unit 307 of the completion of the firmware update. Further, the firmware update unit 309 notifies the job control unit 307 of information about the condition under which the result of the image processing changes, and requests the job control unit 307 to update the image-processed data stored in the output spooler 316.

Receiving the request to update the image-processed data, the job control unit 307 notifies the job data management unit 314 of the information about the condition under which the result of the image processing changes, and inquires of the job data management unit 314 about whether there is a piece of image-processed data stored in the output spooler 316.

Receiving the inquiry, the job data management unit 314 refers to management information and replies to the job control unit 307 about whether there is a piece of image-processed data stored in the output spooler 316.

If there is a piece of image-processed data and there is another job or jobs to be executed, the job control unit 307 executes the corresponding job(s) with a higher priority. After the end of the execution of the job(s), the job control unit 307 inquires of the job data management unit 314 about which piece of job data stored in the input spooler 306 corresponds to the piece of image-processed data.

Receiving the inquiry, the job data management unit 314 refers to the management information and replies to the job control unit 307 about the piece of job data stored in the input spooler 306 corresponding to the piece of image-processed data.

The job control unit 307 processes the corresponding job data stored in the input spooler 306 in a similar manner to when processing job data sent from outside the image processing apparatus 302. Then, the job control unit 307 deletes image-processed data stored in the output spooler 316 according to the deletion condition set in advance using the deletion condition setting unit 313, and stores image-processed data into the output spooler 316.

The job control unit 307 executes, with a higher priority, another job or jobs to be executed, if any, and then performs the processing for updating the image-processed data until there is no image-processed data yet to be updated. When printing, the job control unit 307 transfers the image-processed data from the output spooler 316 to the print engine unit 305. The print engine unit 305 prints the transferred image-processed data.

For reprinting, the UI unit 311 selects a reprint target by using the reprint target selection unit 312. For example, when receiving a request from the UI unit 311, the reprint target selection unit 312 displays a screen for the user to select a reprint target. The reprint target selection unit 312 notifies the UI unit 311 of the selection performed by the user's selection operation via the screen.

Receiving the selection, the job control unit 307 inquires of the job data management unit 314 about where the data of the corresponding job is located.

Receiving the inquiry, the job data management unit 314 refers to the management information and replies to the job control unit 307.

If the corresponding data exists in the output spooler 316, the job control unit 307 transfers the corresponding image-processed data from the output spooler 316 to the print engine unit 305. If the corresponding data exists only in the input spooler 306, the job control unit 307 processes the corresponding job data in a similar manner to when processing job data sent from outside the image forming apparatus 302.

The print engine unit 305 prints the transferred image-processed data.

A third exemplary embodiment will be described below.

Figure 4:
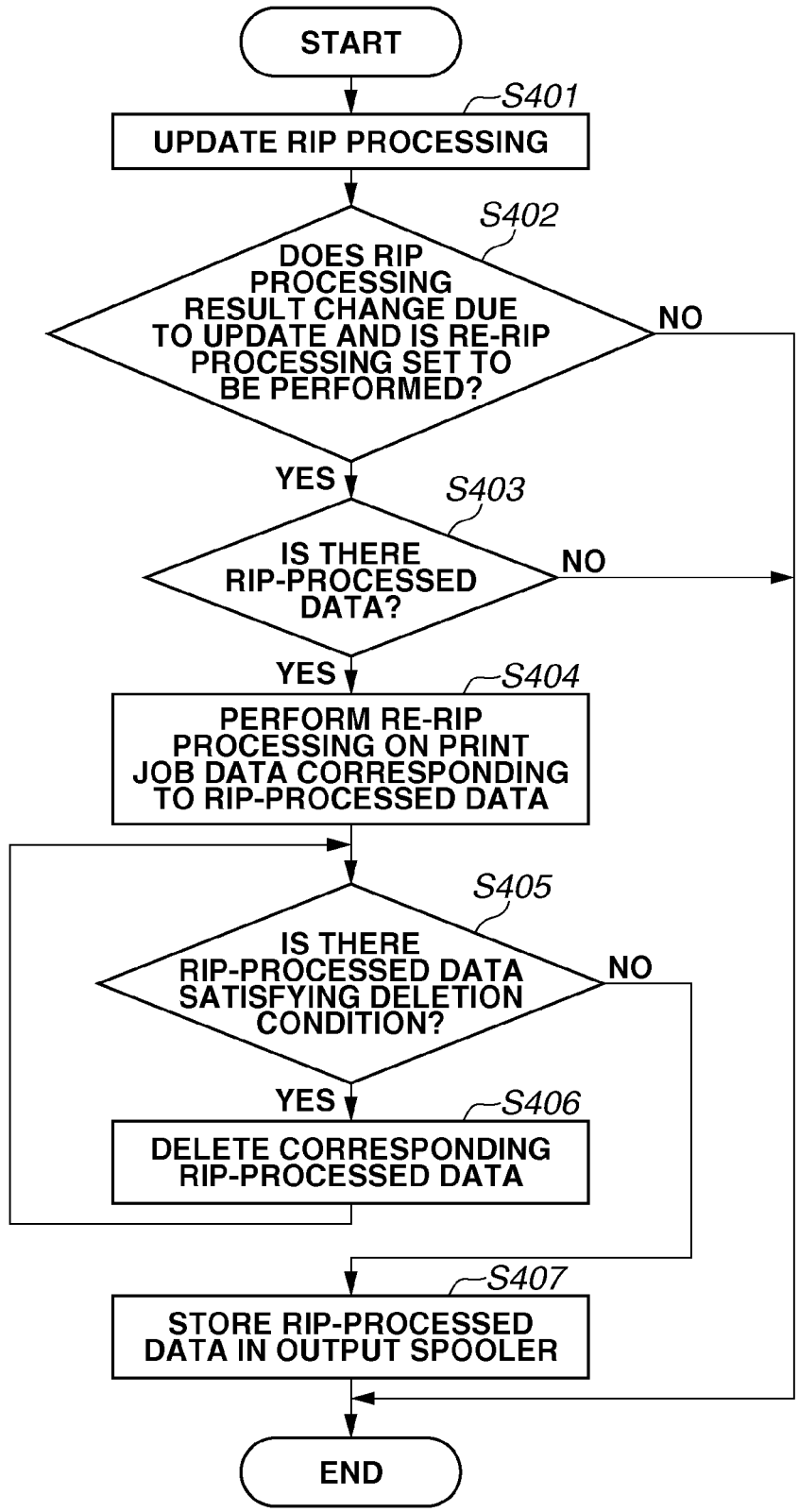
FIG. 4 is a flowchart illustrating an example of image processing.

FIG. 4 is a flowchart illustrating an example of image processing (information processing). FIG. 4 illustrates a flow from update of RIP processing to update of RIP-processed data. For ease of description, the following processing will be described assuming that it is performed by the control portion of the control unit 108 (hereinafter, referred to simply as the control portion), unless otherwise specified.

In step S401, the control portion updates RIP processing. In step S402, the control portion determines whether a RIP processing result changes due to the update and re-RIP processing is set to be performed.

If a RIP processing result changes due to the update and re-RIP processing is set to be performed (YES in step S402), then in step S403, the control portion checks whether there is a piece of RIP-processed data.

If there is a piece of RIP-processed data (YES in step S403), then in step S404, the control portion performs control to identify a piece of print job data yet to be RIP-processed corresponding to the piece of RIP-processed data and perform RIP processing again on the identified print job data.

Herein, the RIP-processed data is an example of image-processed data. The print job data yet to be RIP-processed is an example of data yet to be image-processed. Re-RIP processing is an example of image reprocessing.

Then, as long as there is a piece of RIP-processed data satisfying a deletion condition (YES in step S405), then in step S406, the control portion deletes the corresponding RIP-processed data.

If there is no RIP-processed data to be deleted (NO in step S405), then in step S407, the control portion stores into the output spooler 316 the data obtained by re-RIP processing in step S404.

The processing in steps S405 and S406 does not need to be performed at the point described in FIG. 4. The processing in steps S405 and S406 may be performed after step S407 or at any other timing.

Figure 5:
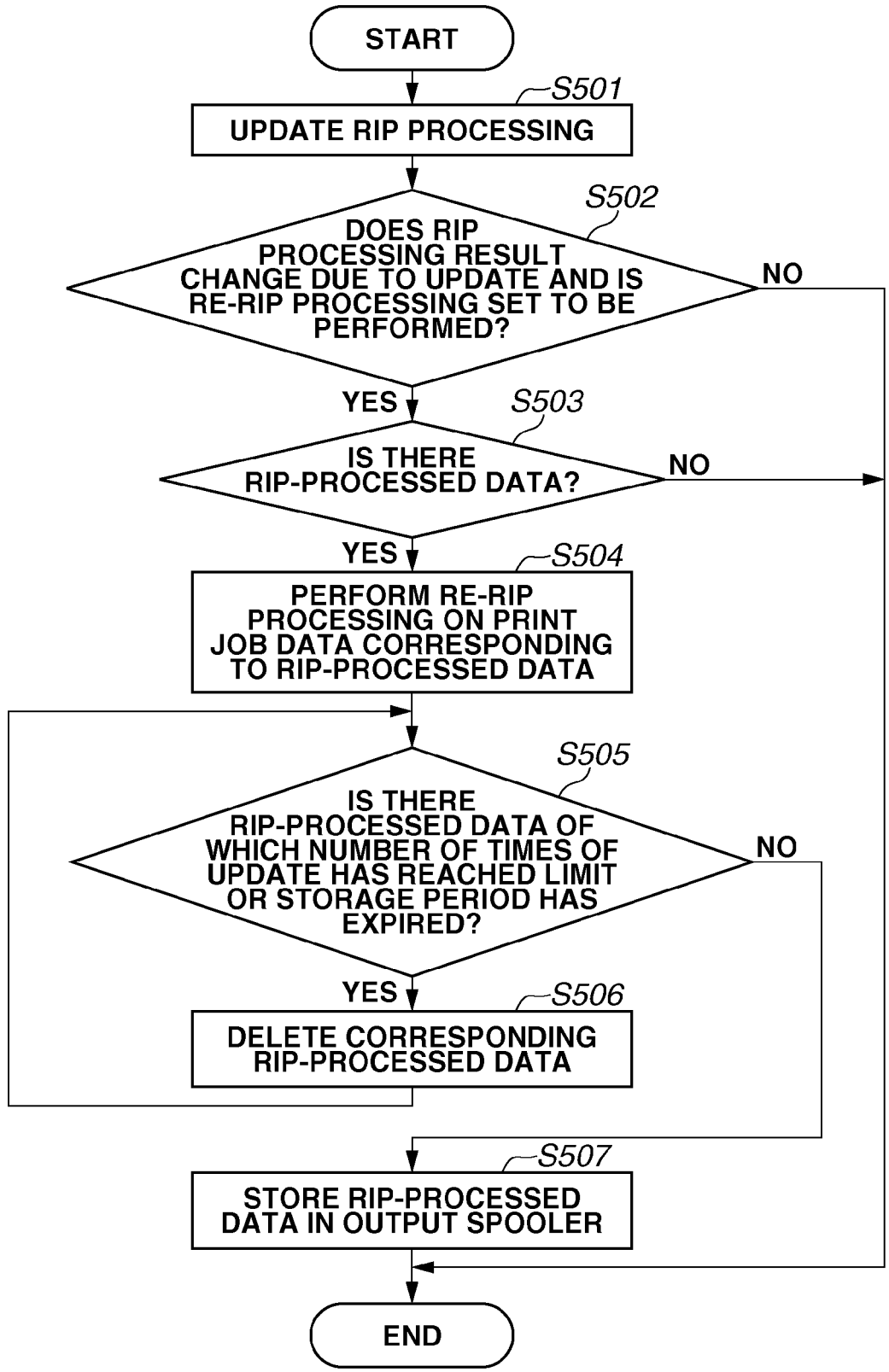
FIG. 5 is a flowchart illustrating an example of image processing.

FIG. 5 illustrates processing where the deletion condition in step S405 is that there is a piece of RIP-processed data of which the number of times of update has reached a limit or a storage period has expired.

Figure 6:
FIG. 6 is a diagram illustrating an example of a setting screen of a deletion condition.

The processing in the steps other than step S505 is similar to that in FIG. 4. The user may set the deletion condition in advance via a screen as illustrated in FIG. 6. Alternatively, the deletion condition may be preset in the image forming apparatus as an initial value. Aside from the deletion condition, a condition for preventing deletion of RIP-processed data may be set via a screen (setting of a storage condition).

In step S505, the control portion determines whether there is a piece of RIP-processed data of which the number of times of update has reached the limit or the storage period has expired. If there is a piece of RIP-processed data of which the number of times of update has reached the limit or the storage period has expired (YES in step S505), the control portion advances the processing to step S506.

The deletion condition described in step S505 and FIG. 5 may be a condition other than the described one. For example, the storage period may be the one starting from storing the RIP-processed data in the control unit 303 or the one starting from completion of image formation.

In step S502, to determine whether a RIP processing result changes due to update, the control portion obtains firmware information such as that illustrated in FIG. 7 at the time of firmware update. The control portion then makes the determination according to processing in the flowchart illustrated in FIG. 8. For example, the firmware information is stored in the firmware update unit 209 for updating the firmware.

First, in step S1201, the control portion checks whether the version of an image correction module changes due to the firmware update. In the example of FIG. 7, the version of the image correction is later than the last updated versions of a red-eye correction and a skin texture and color correction, which are image correction functions. The control portion therefore determines that a RIP processing result does not change in terms of the image correction.

Next, in step S1202, the control portion checks whether the version of a RIP module changes due to the firmware update. In the case of FIG. 7, the RIP version is later than the last updated version of a cyan, magenta, yellow, and black (CMYK) RIP, which is a RIP processing function, but is the same as the last updated version of a red, green, and blue (RGB) RIP, which is also a RIP processing function. The control portion therefore determines that a RIP processing result changes in terms of the RIP processing.

The contents of the image processing do not need to be the image correction and the RIP processing. For example, the contents of the image processing may include either one of the image correction and the RIP processing. Other image processing may also be used.

Figure 8:
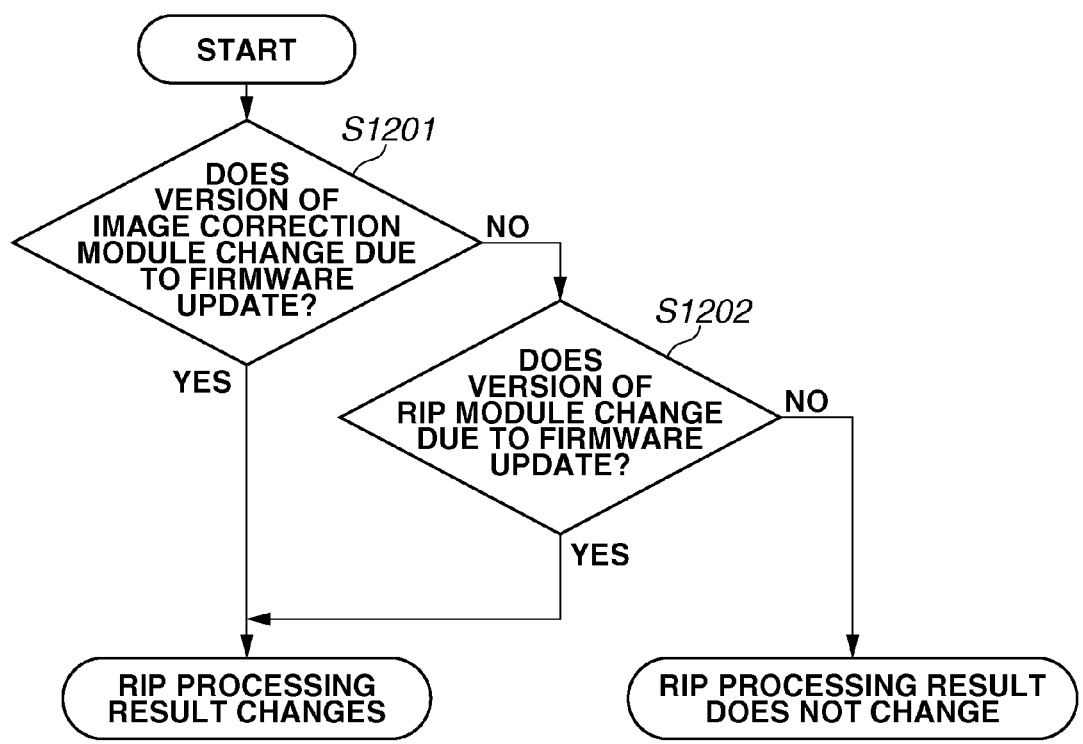
FIG. 8 is a flowchart illustrating an example of information processing for determining whether a raster image processor (RIP) processing result changes due to update.

If the contents of the image processing are different, the processing in FIG. 8 may be modified according to the contents of the image processing. The control portion may determine whether a result of the image processing changes by using determination processing other than that in the flowchart of FIG. 8. The functions of the image correction and the RIP processing may also be different from those illustrated in FIG. 7.

Figure 9:
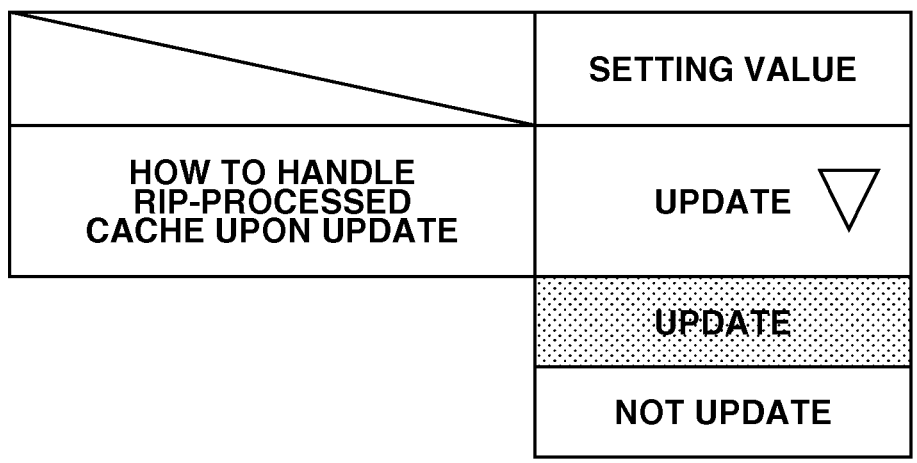
FIG. 9 is a diagram illustrating an example of a screen for setting whether to update RIP-processed data upon firmware update.

As described above, in step S502, the control portion determines whether re-RIP processing is set to be performed. As illustrated in FIG. 9, the control portion may prompt the user to select in advance whether to update RIP-processed data when firmware is updated. Alternatively, either "update" or "not update" may be set as an initial setting value.

If the control portion prompts the user to select whether to update RIP-processed data, the control portion may store the information as a setting of the image forming apparatus in advance. Alternatively, the control portion may prompt the user to select whether to update RIP-processed data when firmware is updated.

Even if the control portion does not prompt the user to select whether to update RIP-processed data, the information may be stored as a setting of the image forming apparatus. Alternatively, the firmware itself may contain setting information about whether to update RIP-processed data when firmware is updated.

A fourth exemplary embodiment will be described.

Figure 10:
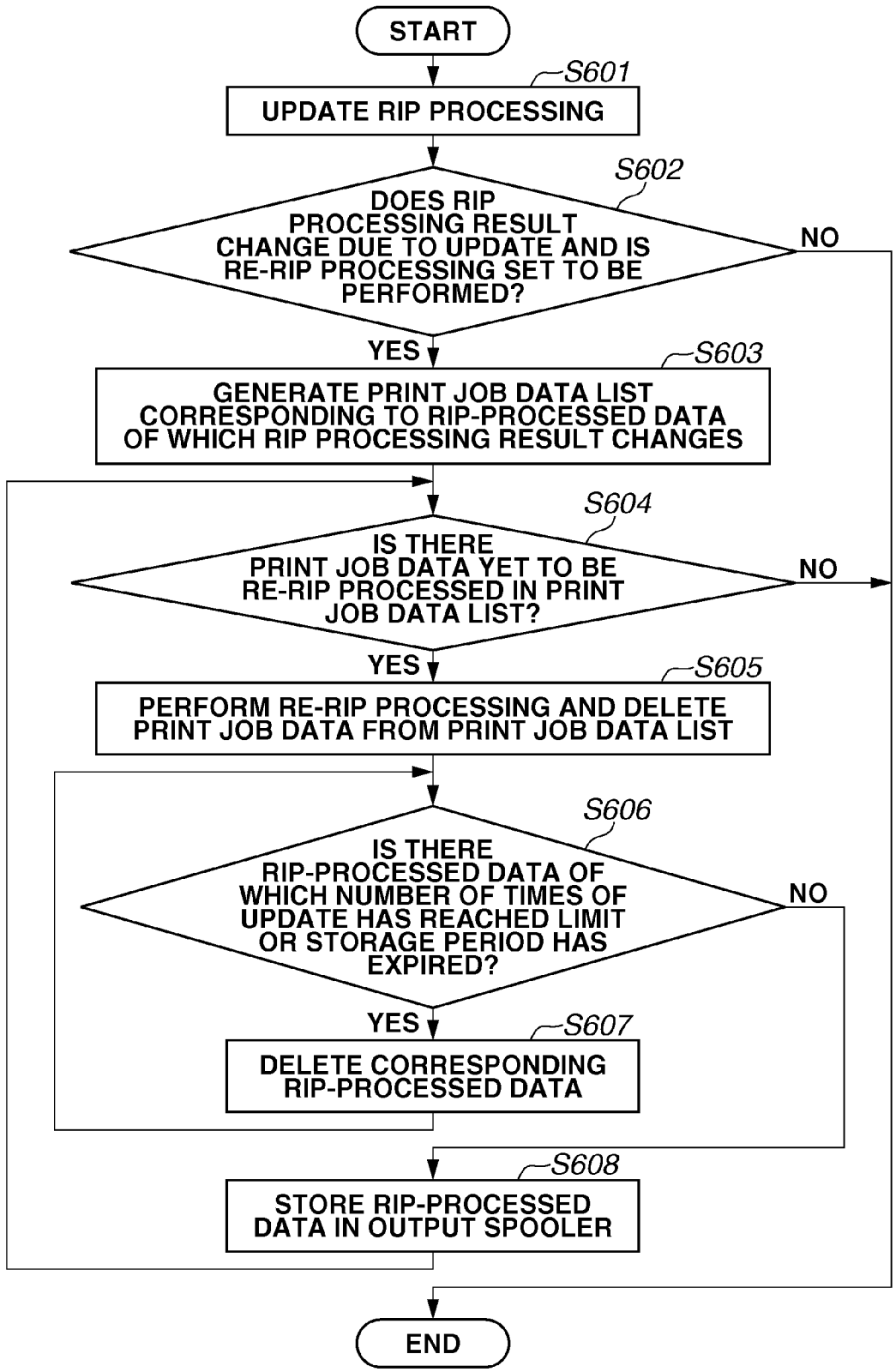
FIG. 10 is a flowchart illustrating an example of image processing.

FIG. 10 is a flowchart illustrating an example of image processing. FIG. 10 illustrates a flow from the update of RIP processing to the update of RIP-processed data. A difference from the third exemplary embodiment lies in that the control portion does not necessarily update all RIP-processed data but updates only RIP-processed data of which the RIP processing result changes.

In step S601, the control portion updates the RIP processing. In step S602, the control portion determines whether a RIP processing result changes due to the update and re-RIP processing is set to be performed.

If a RIP processing result changes due to the update and re-RIP processing is set to be performed (YES in step S602), then in step S603, the control portion identifies RIP-processed data of which the RIP processing result changes, and lists corresponding print job data in a print job data list.

In steps S604 and S605, the control portion performs re-RIP processing on all the print job data listed in the print job data list, and deletes from the print job data list the print job data on which re-RIP processing has been performed.

Each time the control portion performs re-RIP processing, the control portion proceeds to step S606. As long as there is a piece of RIP-processed data of which the number of times of update has reached a limit or the storage period has expired (YES in step S606), then in step S607, the control portion continues to delete the corresponding RIP-processed data from the output spooler 316.

If there is no RIP-processed data to be deleted (NO in step S606), then in step S608, the control portion stores the RIP-processed data obtained by re-RIP processing in step S605 into the output spooler 316.

The processing in steps S606 and S607 does not need to be performed at the point described in FIG. 10. The processing in steps S606 and S607 may be performed after step S608 or at any other timing.

Figure 11:
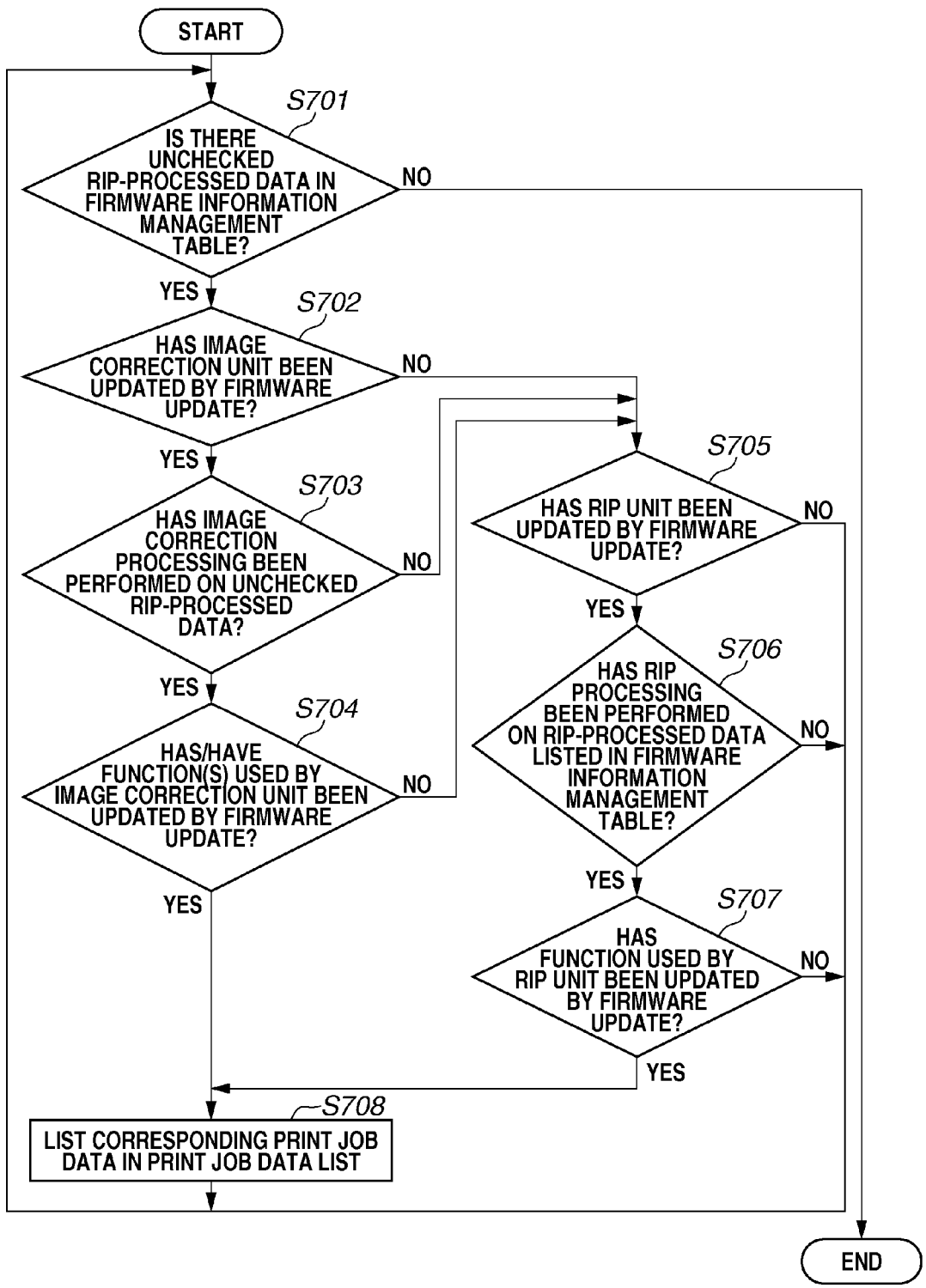
FIG. 11 is a flowchart illustrating an example of information processing for generating a print job data list.

FIG. 11 illustrates an example of the processing for generating the print job data list in step S603.

In step S701, as long as there is a piece of unchecked RIP-processed data in a firmware information management table (illustrated in FIG. 12) (YES in step S701), the control portion continues to determine whether to add the RIP-processed data to the print job data list.

If the image correction unit 317 has been updated by the firmware update (YES in step S702), then in step S703, the control portion checks whether image correction processing has been performed on the unchecked RIP-processed data. In the case of FIG. 12, 1 and 0 in the fields of red-eye correction, skin texture and color correction, RGB RIP, and CMYK RIP represent "used" and "not used," respectively. The control portion determines that an image correction processing has been performed on all the pieces of RIP-processed data other than the one having an index value of 2 (YES in step S703).

In step S704, the control portion checks whether the function(s) used by the image correction unit 317 has/have been updated by the firmware update. FIG. 7 illustrates the firmware information after the firmware update. The control portion thus determines that none of the image correction functions used for the data illustrated in FIG. 12 has been updated (NO in step S704).

In step S705, the control portion determines whether the RIP unit 318 has been updated by the firmware update.

If the RIP unit 318 has been updated by the firmware update (YES in step S705), then in step S706, the control portion checks whether a RIP processing function has been performed on the RIP-processed data listed in the firmware information management table. In the example of FIG. 12, the control portion determines that RIP processing has been performed on all the pieces of data other than the one having the index value of 2 (YES in step 706).

In step S707, the control portion checks whether the functions used by the RIP unit 318 have been updated by the firmware update. FIG. 7 illustrates the firmware information after the firmware update. The control portion thus determines that the RIP processing function used for the pieces of data having the index values of 3 and 5 illustrated in FIG. 12 has been updated (YES in step S707).

In step S708, the control portion lists, in the print job data list, the print job data corresponding to the RIP-processed data of which the function(s) used is/are determined to have been updated.

The image processing functions may be other than the image correction processing and the RIP processing. Whether the functions have been updated by the firmware update may be determined in different order from that in FIG. 11.

A fifth exemplary embodiment will be described below.

Figure 13:
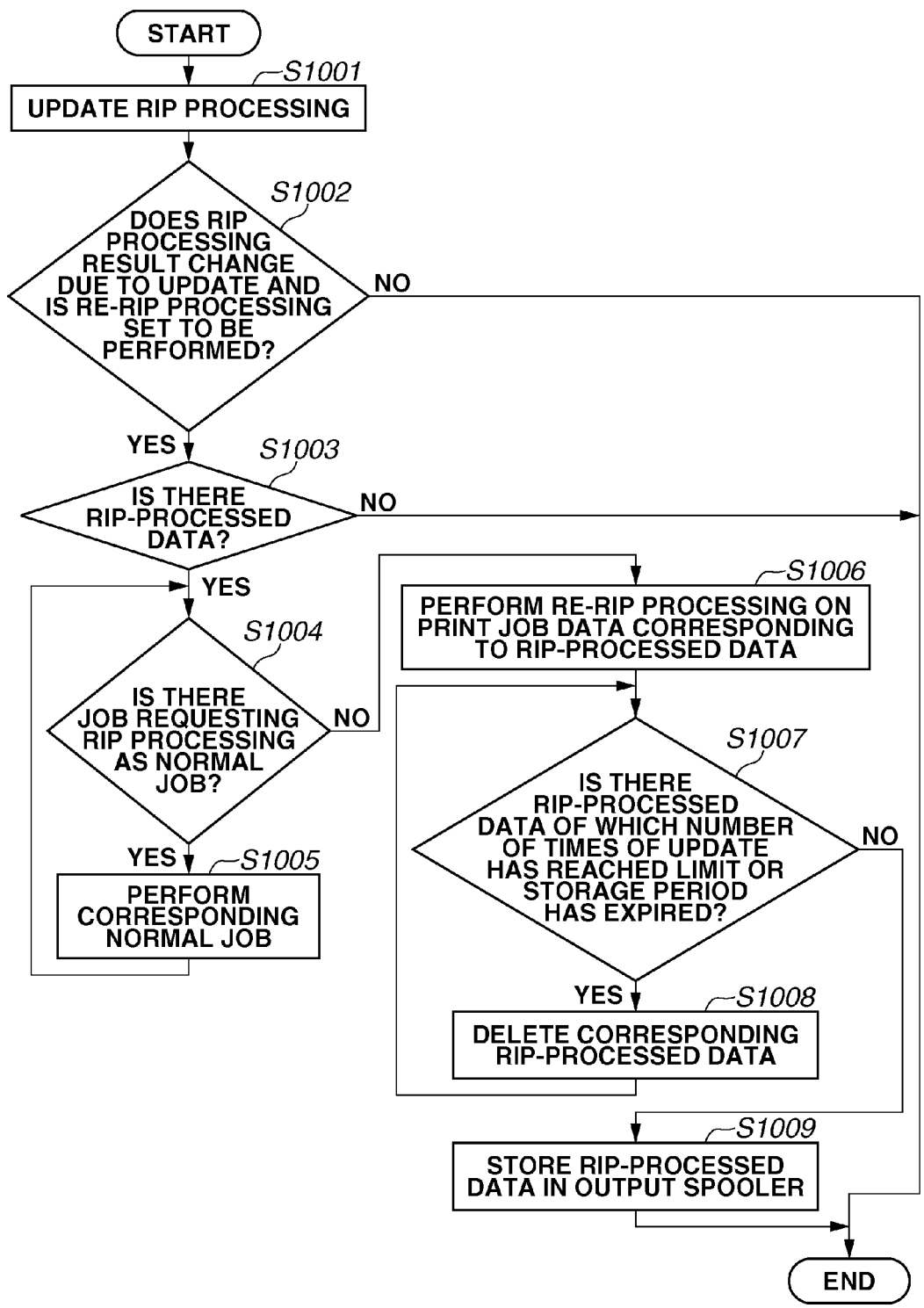
FIG. 13 is a flowchart illustrating an example of image processing.

FIG. 13 is a flowchart illustrating an example of image processing. FIG. 13 illustrates a flow from the update of RIP processing to the update of RIP-processed data. A difference from the third exemplary embodiment lies in that the control portion performs normal RIP processing with a higher priority when performing RIP processing again due to firmware update.

In step S1001, the control portion updates the RIP processing. In step S1002, the control portion determines whether a RIP processing result changes due to the update and re-RIP processing is set to be performed.

If a RIP processing result changes due to the update and re-RIP processing is set to be performed (YES in step S1002), then in step S1003, the control portion checks whether there is a piece of RIP-processed data.

If there is a piece of RIP-processed data (YES in step S1003), then in step S1004, the control portion determines whether there is a job requesting RIP processing as a normal job, other than that requiring re-RIP processing due to the firmware update. As long as there is a job requesting the RIP processing as a normal job (YES in step S1004), then in step S1005, the control portion performs the corresponding normal job with a higher priority.

If there is no other job than that requiring re-RIP processing due to the firmware update (NO in step S1004), then in step S1006, the control portion perform re-RIP processing on the print job data yet to be RIP-processed corresponding to the RIP-processed data.

As long as there is a piece of RIP-processed data of which the number of times of update has reached a limit or the storage period has expired (YES in step S1007), then in step S1008, the control portion deletes the corresponding RIP-processed data.

If there is no RIP-processed data to be deleted (NO in step S1007), then in step S1009, the control portion stores the RIP-processed data obtained by re-RIP processing in step S1006 into the output spooler 316.

The processing in steps S1004 and S1005 does not need to be performed at the timing of steps S1004 and S1005 in FIG. 13. For example, the processing in steps S1004 and S1005 may be performed before step S1002, before step S1003, or at any other timing.

The processing in steps S1007 and S1008 does not need to be performed at the timing of steps S1007 and S1008 in FIG. 13. For example, the processing in steps S1007 and S1008 may be performed after step S1009 or at any other timing.

The deletion condition in step S1007 may be different from the described one. For example, the storage period may be the one starting from storing the RIP-processed data in the control unit 303 or the one starting from completion of image formation.

Step S1003 may be replaced with steps S603 and S604 in FIG. 10 described in the fourth exemplary embodiment to generate a print job data list. If the control portion generates a print job data list, step S1006 is replaced with step S605 in FIG. 10 described in the fourth exemplary embodiment so that the control portion performs re-RIP processing according to the print job data list. If the control portion performs re-RIP processing according to the print job data list, and when the control portion performs the RIP processing on the same print job data as that listed in the print job data list in step S1005, the control portion deletes the corresponding print job data from the print job data list after the end of the RIP processing. In step S1004, if the control portion determines to perform the RIP processing on print job data on which re-RIP processing has been performed, the control portion skips step S1005, considering that the print job data has been RIP-processed.

A sixth exemplary embodiment will be described below.

Figure 14:
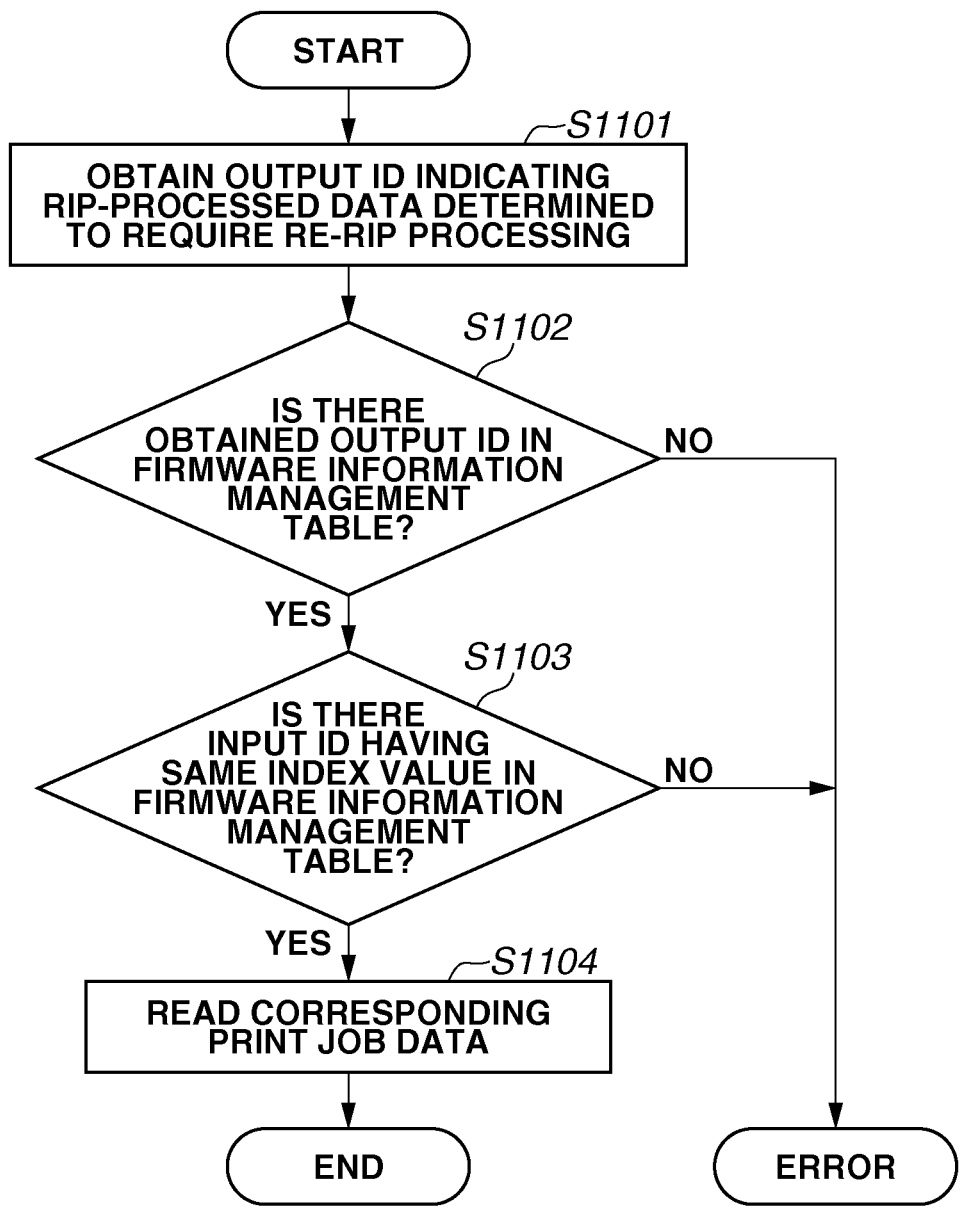
FIG. 14 is a flowchart illustrating an example of re-RIP processing.

FIG. 14 is a flowchart illustrating an example of re-RIP processing. FIG. 14 illustrates a flow from when RIP-processed data that requires re-RIP processing due to firmware update is determined to when print job data corresponding to the RIP-processed data is read.

In step S1101, the control portion obtains an output ID indicating RIP-processed data that is determined to require re-RIP processing due to firmware update. In step S1102, the control portion checks whether the obtained output ID exists in the firmware information management table illustrated in FIG. 12.

If the corresponding output ID exists (YES in step S1102), then in step S1103, the control portion checks the firmware information management table for an input ID having the same index value.

If the corresponding input ID exists (YES in step S1103), then in step S1104, the control portion reads the corresponding print job data and prepares for re-RIP processing.

A condition illustrated in FIGS. 15 and 16 may be added to a condition for determining whether to store RIP-processed data in preparation for reprinting. In FIGS. 15 and 16, the condition is set to store the RIP-processed data of a job in preparation for reprinting even after printing only if the processing time of the job is 30 minutes or more and the job type of the job is Portable Document Format (PDF).

The user may set the condition in advance by using a user interface such as those illustrated in FIGS. 15 and 16. The condition may be stored in the image forming apparatus in advance as an initial setting value. The condition may be other than the processing time and the job type. Whether to store RIP-processed data may be set job by job.

A seventh exemplary embodiment will be described below.

When performing reprinting, as illustrated in FIG. 17, the control portion may present to the user the number of pages, RIP processing date, and firmware version information about the used firmware, along with the top page or the distinctive image of each job.

If the same print job data was RIP-processed for a plurality of days, the control portion specifies RIP processing dates. The user thereby identifies the dates of the data.

To specify a RIP processing date, the control portion displays a menu illustrated in FIG. 18 and prompts the user to specify a RIP processing date.

As illustrated in FIG. 19, the control portion may prompt the user to select a reprinting target in a list form. If a content icon is selected, the control portion displays thumbnail images or preview images of all pages included in the job or in units of predetermined pages from the first page. Using a screen such as that illustrated in FIG. 19, the user may give an instruction to reprint all pages in a job. Alternatively, the user may give an instruction to reprint a specific range of pages.

The control portion may display a user interface different from that illustrated in FIG. 19.

An eighth exemplary embodiment will be described below.

In the foregoing exemplary embodiments, an image forming apparatus has been used as an example of the image processing apparatus. However, an RIP server that can perform communication with an image forming apparatus via a network may be used as an example of the image processing apparatus. The RIP server includes a central processing unit (CPU) and a storage device such as a hard disk (HD). The CPU of the RIP server performs processing based on a program stored in the storage device, whereby functions as a RIP server are implemented.

More specifically, the CPU of the RIP server performs processing based on a program stored in the storage device, whereby the processing according to the foregoing flowcharts is implemented. The RIP sever receives input data from an external apparatus, performs the processing according to the foregoing flowcharts, and transfers RIP-processed image data to a printing apparatus serving as an image forming apparatus.

The RIP server may constitute a single server apparatus or a plurality of server apparatuses.

A ninth exemplary embodiment will be described below.

The image forming apparatus may include only a printing function. The image forming apparatus may further include a reading apparatus for reading an image on a document and function as a copying machine. The image forming apparatus may be configured as a multifunction apparatus including other additional functions.

A tenth exemplary embodiment will be described below. The image forming function of the image forming apparatus does not need to be a printing function, and may be other image forming functions. Examples include a display function, a projector function, and a three-dimensional (3D) modeling function.

An eleventh exemplary embodiment will be described below. If an image processing apparatus (such as a RIP server) is located outside an image forming apparatus, the image forming apparatus and the image processing apparatus do not need to be connected in a one-to-one manner. An image processing apparatus that performs the foregoing RIP-related processing may be arranged on a cloud server side, and at least one or more client devices may be connected to the cloud server via a wired and/or wireless network or networks. An image processing apparatus or apparatuses connected to the client device(s) and/or the client device(s) itself/themselves may have an image forming function.

As described above, if the control portion performs firmware update that changes a RIP processing result, cache before the firmware update becomes useless. The control portion therefore performs re-RIP processing to update the cache memory during idle time, for example. This can reduce the time needed when an image is formed again after the firmware update.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-098666 filed May 8, 2013, which is hereby incorporated by reference herein in its entirety.

What is claimed is:

1. An image processing apparatus comprising:
    an image processing unit configured to perform image processing on input data;
    a storage unit configured to store image-processed data obtained by the image processing performed by the image processing unit;
    an output unit configured to output the image-processed data to a printing unit;
    an update unit configured to update firmware related to the image processing unit; and
    a control unit configured to, when the image processing by the image processing unit is changed by the updating of the firmware by the update unit, identify input data corresponding to the image-processed data stored in the storage unit, transmit the identified input data to the image processing unit, cause the image processing unit to perform the image processing, cause the storage unit to store image-processed data obtained by the image processing, and store image-processed data obtained as a result of performing the image processing into the storage unit.

2. The image processing apparatus according to claim 1, wherein the control unit is configured to, when the image processing by the image processing unit is changed by updating of the firmware by the update unit and image-processed data is stored in the storage unit, identify input data corresponding to the image-processed data stored in the storage unit, transmit the identified input data to the image processing unit and cause the image processing unit to perform the image processing, and store image-processed data obtained as a result of performing the image processing into the storage unit.

3. The image processing apparatus according to claim 1, further comprising a setting unit configured to set whether to cause the image processing unit to perform the image processing again when the firmware is updated,
    wherein the control unit is configured to, when the image processing by the image processing unit is changed by the updating of the firmware by the update unit and the image processing is set by the setting unit to be performed again, identify input data corresponding to the image-processed data stored in the storage unit, transmit the identified input data to the image processing unit and cause the image processing unit to perform the image processing, and store image-processed data obtained as a result of performing the image processing into the storage unit.

4. The image processing apparatus according to claim 1, wherein the storage unit includes an input spooler configured to store the input data and an output spooler configured to store the image-processed data.

5. The image processing apparatus according to claim 1, wherein the control unit is configured to, when the image processing unit is performing other processing, transmit the input data to the image processing unit and cause the image processing unit to perform the image processing after the other processing ends, and store image-processed data obtained as a result of performing the image processing into the storage unit.

6. The image processing apparatus according to claim 1, wherein the control unit is configured to, when the image processing by the image processing unit is changed by the updating of the firmware by the update unit and image-processed data obtained by the image processing unit is stored in the storage unit, delete the image-processed data from the storage unit.

7. The image processing apparatus according to claim 6, further comprising:
    an image forming unit configured to perform image formation by using image-processed data stored in the storage unit; and
    a storage condition setting unit configured to set a condition for preventing the control unit from deleting the image-processed data stored in the storage unit even after the image formation by the image forming unit.

8. A method for processing an image, the method comprising:
    performing image processing, by an image processing unit, on input data;

causing a storage unit to store image-processed data obtained by the image processing;
outputting the image-processed data to a printing unit;
updating firmware related to the image processing; and
identifying, when the image processing by the image processing unit is changed by the updating of the firmware by the update step, input data corresponding to the image-processed data stored in the storage unit, transmitting the identified input data to the image processing unit, causing the image processing unit to perform the image processing, causing the storage unit to store image-processed data obtained by the image processing, and storing image-processed data obtained as a result of performing the image processing into the storage unit.

9. A non-transitory computer-readable storage medium storing a program that causes a computer to perform a method, the method comprising:

performing image processing, by an image processing unit, on input data;
causing a storage unit to store image-processed data obtained by the image processing;
outputting the image-processed data to a printing unit;
updating firmware related to the image processing; and
identifying, when the image processing by the image processing unit is changed by the updating of the firmware by the update step, input data corresponding to the image-processed data stored in the storage unit, transmitting the identified input data to the image processing unit, causing the image processing unit to perform the image processing, causing the storage unit to store image-processed data obtained by the image processing, and storing image-processed data obtained as a result of performing the image processing into the storage unit.

* * * * *